United States Patent
Cho et al.

(10) Patent No.: US 7,023,919 B2
(45) Date of Patent: Apr. 4, 2006

(54) METHOD FOR CODING MOTION VECTOR USING 2-DIMENSIONAL MINIMUM BITRATE PREDICTING TECHNIQUE

(75) Inventors: Hyun Duk Cho, Kyungki-Do (KR); Sung Deuk Kim, Kyungki-Do (KR)

(73) Assignee: LG Electronics Inc., Seoul (KR)

( * ) Notice: Subject to any disclaimer, the term of this patent is extended or adjusted under 35 U.S.C. 154(b) by 673 days.

(21) Appl. No.: 10/002,183

(22) Filed: Dec. 5, 2001

(65) Prior Publication Data

US 2002/0075957 A1 Jun. 20, 2002

(30) Foreign Application Priority Data

Dec. 6, 2000 (KR) ................... 2000-73696

(51) Int. Cl.
  *H04N 7/12* (2006.01)
(52) U.S. Cl. ............ 375/240.16; 382/238; 348/394.1
(58) Field of Classification Search .......... 375/240.16, 375/240, 240.12, 240.27; 382/236, 238; 348/402.1, 394.1, 409.1, 394
  See application file for complete search history.

(56) References Cited

U.S. PATENT DOCUMENTS 5,594,504 A * 1/1997 Ebrahimi ............... 375/240.16
6,271,885 B1 * 8/2001 Sugiyama ............... 348/402.1
6,498,810 B1 * 12/2002 Kim et al. ................... 375/240
6,690,833 B1 * 2/2004 Chiang et al. .............. 382/236
6,735,249 B1 * 5/2004 Karczewicz et al. ........ 375/240

OTHER PUBLICATIONS

Sung Deuk Kim and Jong Beom Ra, An Efficient Motion Vector Coding Scheme Based on Minimum Bitrate Prediction, Aug. 1999, vol. 8, No. 8, pp. 1117-1120, IEEE Transactions on Image Processing.

* cited by examiner

*Primary Examiner*—Gims Philippe
(74) *Attorney, Agent, or Firm*—Fleshner & Kim, LLP

(57) ABSTRACT

A method for coding a motion vector using a 2-dimensional minimum bitrate predicting technique is disclosed. A mode information (MODE) commonly adopted to the factors 'X' and 'Y' are transmitted to thereby reduce its transmission burden by using the two-dimensional minimum bitrate predicting technique, so that a coding efficiency of a motion vector can be improved. In addition, the two-dimensional MVD information coding method is proposed for the low transfer rate mobile image which is very small and has very small motion, so that even if a distribution characteristic of the MVD information is changed according to the minimum bitrate prediction, a coding efficiency of a major motion vector can be improved.

31 Claims, 3 Drawing Sheets

| MVDx$_{mbp}$ | MODEx | MVDy$_{mbp}$ | MODEy |
|---|---|---|---|
| | (0~2 bit) | | (0~2 bit) |

| MVDxy$_{mbp}$ | MODExy |
|---|---|
| | (0~2 bit) |

FIG. 7

| No. of valid MVCi | True motion vector among valid MVCi | | | No. of bits | Code |
|---|---|---|---|---|---|
| 1 | Unique | | | 0 | x |
| 2 | MVC1 | MVC1 | MVC2 | 1 | "0" |
| | MVC2 | MVC3 | MVC3 | 1 | "1" |
| 3 | | MVC1 | | 1 | "0" |
| | | MVC2 | | 2 | "10" |
| | | MVC3 | | 2 | "11" |

FIG. 8

| Syntax(Code) | Meaning |
|---|---|
| "1" | MVDx=0 and MVDy=0 |
| "00"+MVDx+MVDy | MVDx≠0 and MVDy≠0 |
| "010"+MVDx | MVDx≠0 and MVDy=0 |
| "011"+MVDy | MVDx=0 and MVDy≠0 |

FIG. 9

| $MVDx_{mbp} + MVDy_{mbp}$ | $MODEx + MODEy$ |
|---|---|
| | (0~4 bit) |

METHOD FOR CODING MOTION VECTOR USING 2-DIMENSIONAL MINIMUM BITRATE PREDICTING TECHNIQUE

BACKGROUND OF THE INVENTION

1. Field of the Invention

The present invention relates to a coding method of a motion vector, and more particularly, to a method for coding a motion vector using a 2-dimensional minimum bitrate predicting technique.

2. Description of the Background Art

In general, a motion vector is coded by a lossless coding in a mobile image compression. In such a case, a differential pulse code modulation (DPCM) technique is mostly used which is divided by a portion for computing a prediction value of a motion vector to be currently coded and a portion for coding a prediction error between the computed prediction value and the current motion vector.

Accordingly, a mobile image compression performance depends on how successfully the current motion vector is predicted by using a neighboring motion vector which has been already transmitted.

Conventional motion vector coding method roughly includes a Median predicting technique and one-dimensional minimum bitrate predicting technique.

The Median predicting technique is mostly used for an H.263 and an MPEG-4, in which a median value of previously transmitted neighboring motion vectors is computed as a prediction value of a motion vector to be currently coded and only a prediction error between the computed prediction value and the current motion vector to be coded is coded and transmitted.

In detail, as shown in FIG. 1, on the assumption that a motion vector to be currently coded is MV and neighboring motion vectors are MV1, MV2 and MV3, a motion vector coding method using the conventional median predicting technique can be implemented in the form as shown in FIG. 2.

First, a predictor 10 obtains a median value of the previously transmitted neighboring motion vectors MV1, MV2 and MV3 and computes a prediction value (PMV) for the motion vector MV to be currently coded.

$PMV_X$=Median $(MV1x, M2x, M3x)$ $PMV_Y$=Median $(MV1y, M2y, M3y)$

After the prediction value (PMV) is computed, a subtracter 12 subtracts the prediction value (PMV) outputted from the predictor 10 from a motion vector (MV) to be currently coded in order to compute a prediction error (MVD).

$MVDx=MVx-PMVx$ $MVDy=MVy-PMVy$

The prediction value (PMV) and the prediction error (MVD) are processed by X and Y factors.

An encoder 14 performs a variable length coding on the prediction error (MVD) outputted from the subtracter 12 and transmits it to a destination.

Meanwhile, the one-dimensional minimum bitrate predicting technique is a method of checking to see which one of the neighboring motion vectors should be used as a prediction value to generate the smallest (the minimum bitrate) prediction error (MVD), and then the detected minimum bitrate prediction error (MVDmbp) and MODE information indicative of a corresponding motion vector are transmitted together.

First, the minimum bitrate predicting technique computes a prediction error (MVD) generated when the neighboring motion vectors (MV1, MV2 and MV3) are respectively used as a prediction value, for a factor 'X'. As shown in FIG. 3A, assuming that MV=1, MV1=0, MV2=3 and MV3=4.5, the prediction errors (MVDx) of the motion vectors (MV1, MV2 and MV3) for the factor 'X' are respectively +1.0, −2.0 and −3.5.

Once the prediction errors (MVDx) are computed, the encoder 14 selects an MVD value (MVDmbp) which generates the minimum bitrate among the computed prediction errors and codes the MVD value first.

Thus, on the assumption that the bitrate is in proportion to an absolute value of the prediction error (MVD), since the motion vector (MV1=0) generates the smallest bitrate, the encoder 14 codes the 'MVDxmbp=+1.0' with a variable length code and transmits it.

If the minimum bit prediction error (MVDxmbp=+1.0) is transmitted, the encoder 14 is to transmit mode information (MODEX) indicating that the MV1 has been used as a prediction value. For this purpose, as shown in FIG. 3B, the encoder 14 defines a candidate motion vector that the decoder can obtain only with the minimum prediction error (MVDxmbp=+1.0) and the neighboring motion vectors (MV1, MV2 and MV3).

In other words, the encoder 14 searches out candidate motion vectors (MVC1, MVC2 and MVC3) by using the minimum prediction error (MVDxmbp=+1.0) and the previously transmitted neighboring motion vectors (MV1, MV2 and MV3).

The MVC1 is a motion vector candidate value obtained by using MVDxmbp when the MV1 has been used as a prediction value, and MVC2 is a motion vector candidate value obtained by using the MVDxmbp when the MV2 has been used as a prediction value. Also, the MVC3 is a motion vector candidate value obtained by using the MVDxmbp when the MV3 has been used as a prediction value.

Among them, however, MVC2 is failed to be a real candidate value. The reason for this is that if the MVC2 is a motion vector to be substantially transmitted. −0,5, rather than +1,0, as a minimum prediction error (MVDxmbp) should have been transmitted by having MV2 as a prediction value. Thus, since MVC1 and MVC3 are the actually effective candidate motion vectors, the encoder generates mode information (MODEx) as information of 1 bit ('0' or '1') and transmits it.

After the minimum prediction error (MVDxmbp) and the mode information (MODEx) for the factor 'X' are completely transmitted, the encoder 14 performs the same process to obtain a minimum prediction error (MVDymbp) and mode information (MODEy) for a factor 'Y' and transmits them. FIG. 4 illustrates the structure of the bit stream which is transmitted at this time.

However, the conventional motion vector coding method using the Median predicting technique and the one-dimensional minimum bitrate predicting technique has a problem that since the factors 'X' and 'Y' of the motion vector are independently processed, causing a disturbance to a real time compression coding and an increase in the amount of the transmitted data, Especially, in case of the motion vector coding method using the one-dimensional minimum bitrate predicting technique, since the factors 'X' and 'Y' exist also in the mode information as well as in the prediction error information, transmission burden of the mode information is much increased.

In addition, the prediction error (MVD) generated according to the minimum bitrate predicting technique is more converged to (0,0) compared to the prediction error (MVD) obtained by the Median predicting technique. But the conventional motion vector coding method fails to provide a solution which may allow to effectively use a distribution characteristic change of the prediction error (MVD) generated due to the prediction technique.

The above references are incorporated by reference herein where appropriate for appropriate teachings of additional or alternative details, features and/or technical background.

SUMMARY OF THE INVENTION

Therefore, an object of the present invention is to provide a method for improving a coding efficiency of a motion vector by transmitting prediction error information (MVD) and mode information (MODE) by using a two-dimensional minimum bitrate predicting technique.

Another object of the present invention is to provide a method for heightening a coding efficiency by two-dimensionally coding prediction error information generated due to a minimum bitrate predicting technique.

Still another object of the present invention is to provide a method for effectively coding mode information (MODE) which is commonly adopted to factors 'X' and 'Y' by using a two-dimensional minimum bitrate predicting technique.

Yet another object of the present invention is to provide a method for coding two-dimensional prediction error information for a mobile image of a low transfer rate in a small size and with a little motion.

To achieve at least the above objects in whole or in parts, there is provided a method for coding a motion vector including the steps of: computing two-dimensional prediction error information by using a motion vector to be coded and the n (n≧1) number of neighboring motion vectors; selecting prediction error information having the minimum bitrate from the computed prediction error information; obtaining mode information indicative of a neighboring motion vector which has occurred the prediction error information of the minimum bitrate: and coding the obtained prediction error information of the minimum bitrate and the mode information.

To achieve at least these advantages in whole or in parts, there is further provided a method for coding a motion vector including the steps of: computing prediction error information between a motion vector to be coded and the n (n≧1) number of neighboring motion vectors; selecting prediction error information of the minimum bitrate from the computed prediction error information; checking whether factors 'X' and 'Y' of the obtained prediction error information of the minimum bitrate are '0' and coding the prediction error information of the minimum bitrate; and coding mode information indicative of a neighboring motion vector which has generated the prediction error information of the minimum bitrate.

Additional advantages, objects, and features of the invention will be set forth in part in the description which follows and in part will become apparent to those having ordinary skill in the art upon examination of the following or may be learned from practice of the invention. The objects and advantages of the invention may be realized and attained as particularly pointed out in the appended claims.

BRIEF DESCRIPTION OF THE DRAWINGS

The invention will be described in detail with reference to the following drawings in which like reference numerals refer to like elements wherein:

FIG. 7 is a drawing illustrating a method for coding mode information (MODE) in coding a motion vector in accordance with the preferred embodiment of the present invention;

FIG. 8 is a drawing illustrating an example of a two-dimensional coding of prediction error information (MVD) in coding the motion vector in accordance with the preferred embodiment of the present invention;

FIG. 9 is a drawing illustrating a bit stream structure for two-dimensionally coding a one-dimensional minimum bitrate predicting technique-based bit stream structure.

DETAILED DESCRIPTION OF THE PREFERRED EMBODIMENTS

The present invention presents a method for transmitting prediction error information (MVD) and mode information (MODE) commonly adopted to factors 'X' and 'Y' through a two-dimensional minimum bitrate predicting technique.

In general, a vector nearest to a motion vector to be coded among neighboring motion vectors has a high possibility of having the smallest distance to the motion vector to be coded in the aspect of the factors of 'X' and 'Y'.

Thus, the present invention proposes a method for improving a coding efficiency of a motion vector by reducing a load of the mode information (MODE) while, though, having a bit increased prediction error (MVD) information, through a two-dimensional access method.

In addition, the present invention proposes a method for two-dimensionally coding MVD information by using a characteristic that a prediction error generated due to a minimum bitrate predicting technique is more converged to (0,0) compared to a prediction error obtained by the Median technique.

Figures 4, 5, 6:
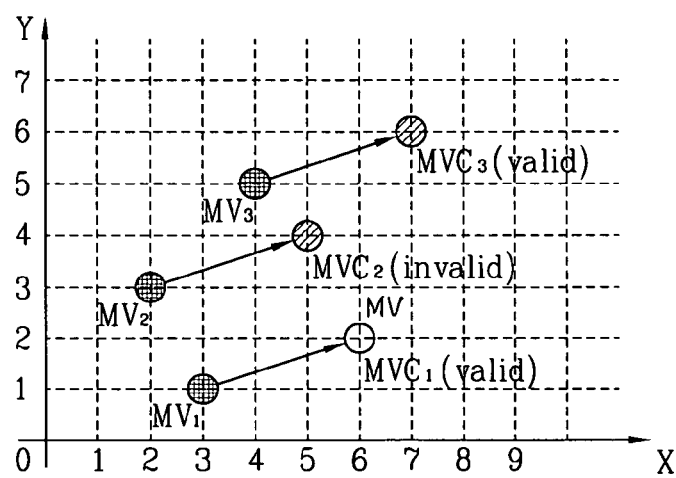
FIG. 4 is a drawing illustrating a bit stream of a coded motion vector of FIG. 3 in accordance with the conventional art.
FIG. 5 is a drawing illustrating a bit stream structure for coding a two dimensional minimum bitrate predicting technique-based motion vector in accordance with a preferred embodiment of the present invention.
FIG. 6 is a drawing illustrating showing a method for coding the two-dimensional minimum bitrate predicting technique-based motion vector in accordance with the preferred embodiment of the present invention

FIG. 5 is a drawing illustrating a bit stream structure for coding a two-dimensional minimum bitrate predicting technique-based motion vector in accordance with a preferred embodiment of the present invention.

As shown in FIG. 5, a bit stream structure of the present invention includes a minimum bit prediction error (MVDxymbp) indicative of a prediction error of a minimum bitrate on the factors of 'X' and 'Y' and mode information (MODExy) indicative of a neighboring motion vector used when the minimum bit prediction error (MVDxymbp) is generated.

The minimum bit prediction error (MVDxymbp) is a two-dimensional variable length code (VLC) but, without being limited thereto, may have a form that a two-dimensional VLC and a one-dimensional VLC are mixed.

FIG. 6 is a drawing illustrating the prediction error information (MVD) and the mode information (MODE) according to the two-dimensional minimum bitrate prediction in accordance with the preferred embodiment of the present invention.

First, on the assumption that MV=(6,2), MV1=(3,1), MV2=(2,3) and MV3 =(4,5), in order to code a motion vector (MV), an encoder computes a prediction error (MVCxy) generated when each of neighboring motion vectors (MV1, MV2 and MV3) are used as prediction vectors.

At this time, when the MV1 is used as a prediction value, MVCxy is (+3,+1). When the MV2 is used as a prediction value, MVDxy is (+4,−1). When the MV3 is used as a prediction value, MVDxy is (+2,−3).

After the prediction error (MVDxy) is computed, the encoder selects a prediction error value which generates a minimum bitrate among the computed prediction errors (MVDxy), that is, the minimum bit prediction error (MVDxymbp) and codes it first.

Thus, on the assumption that the bitrate is in proportion to the absolute value of the prediction error (MVDxy), since the smallest bitrate ('4') is generated when the motion vector (MV1) is used as a prediction value, the encoder codes the MVCxymbp=(+3,+1) with a variable length code and transmits it. Once the minimum bit prediction error (MVDxymbp) is transmitted, the encoder should transmit mode information (MODExy) that MV1 has been used as a prediction value.

Once the minimum bit prediction error (MVDxymbp=+3,+1) is completely transmitted, the encoder obtains three candidate motion vectors (MVC1, MVC2 and MVC3) as shown in FIG. 6 by using the 'MVDxymbp (+3,+1)' and the previously transmitted neighboring motion vectors (MV1, MV2 and MV3), and checks an effective candidate motion vector among the obtained three candidate motion vectors (MVC1, MVC2 and MVC3).

At this time, MVC1 (6,2) is a motion vector candidate obtained by using MVDxymbp (+3,+1) when MV1 (3,1) has been used as a prediction value. MVC2 (5,4) is a motion vector candidate obtained by using MVDxymbp (+3,+1) when MV2 (2,3) has been used as a prediction value. MVC3 (7,6) is a motion vector candidate obtained by using MVDxymbp (+3,+1) when MV3 (4,5) has been used as a prediction value.

In this respect, however, MVC2 (5,4) is failed to be a real candidate motion vector. The reason for this is that, if MVC2 had been a motion vector (MV) to be actually transmitted, a minimum prediction error (MVDxymbp) of (+1,−1), i.e., the value when MV3 is used as a prediction value, rather than (+3,+1), should be transmitted. Thus, MVC1 and MVC3 remain as actual effective candidate motion vectors.

After the effective motion vectors (MVC1 and MVC3) are identified, the encoder should transmit mode information (MODExy) indicating which one of the corresponding effective motion vectors (MVC1 and MVC3) is a real motion vector (MV).

Accordingly, since MVC1 indicates a motion vector (MV) to be actually coded currently, the encoder assigns code information ('0', or '1') of 1 bit indicative of MVC1 as mode information (MODExy).

FIG. 7 illustrates a mode bit syntax according to the number of effective MVCs.

As shown in FIG. 7, if there is only one effective motion vector (MVC), the encoder does not perform a code assigning. If there are two effective MVCs, the encoder assigns 1 bit code information ('0' or '1') and codes it. If there are three effective MVCs, the encoder assigns 1 bit code information ('0') to one MVC and 2 bit code information ('10', '11') to the other two MVCs.

The motion vector coding method on the basis of the two-dimensional minimum bitrate predicting technique can be extended to a multi-dimensional processing, and especially, can be adopted to any field where a general lossless coding method as well as the motion vector coding is applied. And, obviously, the number and the position of neighboring motion vector as used can be arbitrarily changed.

As aforementioned, in the two-dimensional minimum bitrate prediction-based motion vector coding method of the present invention, the amount of mode information (MODExy) can be considerably reduced though the information amount of the prediction error (MVDxy) is somewhat increased owing to consideration of the factors 'X' and 'Y' compared to the conventional one-dimensional minimum bitrate prediction-based motion vector coding.

FIG. 8 is a drawing illustrating another example of a method for two-dimensionally coding prediction error information (MVD) in the bit stream structure of FIG. 5.

In case of a very small mobile image with a very little motion, motion vectors are mostly distributed by being converted to the origin (0,0) on a two-dimensional coordinates.

Thus, in this method, the prediction error information (MVD) would be concentratively distributed at the origin (0,0), and especially, in case of the minimum bitrate prediction-based case, the origin-concentration phenomenon becomes more strengthened.

The MVD information coding method as illustrated in FIG. 8 is a mixture form of a sort of two-dimensional variable length coding (VLC) and a one-dimensional variable length coding (VLC) which have a weight at the origin (0,0). That is, header information of the prediction error information (MVD) has a two-dimensional form, while the remaining information has a two-dimensional or one-dimensional form.

First, the encoder computes minimum bit prediction errors (MVDxmbp, MVDymbp) on the factors 'X' and 'Y' by using the two-dimensional minimum bitrate predicting method and checks whether MVDxmbp and MVDymbp are '0'.

If MVDxmbp and MVDymbp are all '0', the encoder codes only 1 bit information and transmits it. If, however, MVDxmbp and MVDymbp are not both '0', the encoder codes 2 bit header information ('00') and the corresponding MVDsmbp and MVDxmbp together and transmits them.

If one of MVDxmbp and MVDymbp is '0', the encoder codes MVD value (MVDxmbp or MVDymbp) other than '0' following 3 bit header information and transmits it. The 3 bit header information contains information indicating which factor ('X' or 'Y') is '0'.

The above mentioned two-dimensional coding method can be adaptively performed according to the state of neighboring motion vectors (MV1, MV2 and MV3).

Figure 1:
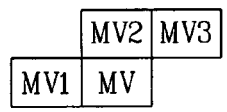
FIG. 1 is a drawing illustrating a motion vector to be coded and a reference neighboring motion vector.
Figure 2:
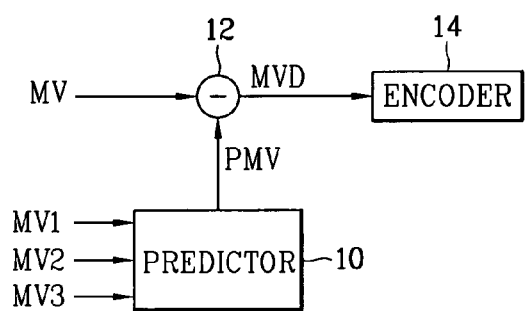
FIG. 2 is a schematic view showing an encoder for performing a coding on a motion vector in accordance with a conventional Median predicting technique.
Figure 3A:
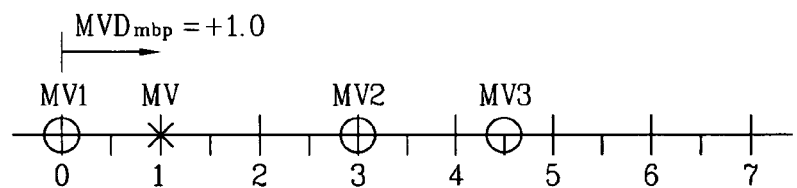
FIG. 3 is a drawing illustrating a coding principle of a motion vector on the basis of the conventional one-dimensional minimum bitrate predicting technique.
Figure 3B:
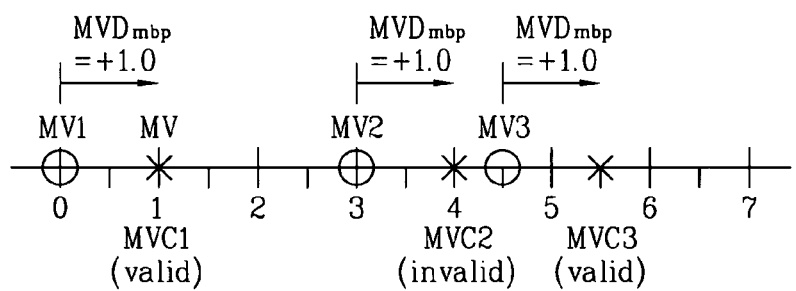

In addition, the two-dimensional MVD information coding method as illustrated in FIG. 8 can be not only adopted to the two-dimensional minimum bitrate predicting technique but also used for coding the one-dimensional minimum bitrate predicting method-based generated MVD information. For this purpose, the conventional bit stream structure as shown in FIG. 3 is to be changed to a bit stream structure as shown in FIG. 9. The MVD information (MVDxmbp, MVDymbp) and the mode information (MODE) are sequentially connected for the factors 'X' and 'Y'.

As so far described, the method for coding a motion vector using a 2-dimensional minimum bitrate predicting technique of the present invention has many advantages.

That is, for example, the mode information (MODE) commonly adopted to the factors 'X' and 'Y' are transmitted to thereby reduce its transmission burden by using the two-dimensional minimum bitrate predicting technique, so that a coding efficiency of a motion vector can be improved.

In addition, the two-dimensional MVD information coding method is proposed for the low transfer rate mobile image which is very small and has very small motion, so that even if a distribution characteristic of the MVD information is changed according to the minimum bitrate prediction, a coding efficiency of a major motion vector can be improved.

The foregoing embodiments and advantages are merely exemplary and are not to be construed as limiting the present invention. The present teaching can be readily applied to other types of apparatuses. The description of the present invention is intended to be illustrative, and not to limit the scope of the claims. Many alternatives, modifications, and variations will be apparent to those skilled in the art. In the claims, means-plus-function clauses are intended to cover the structure described herein as performing the recited function and not only structural equivalents but also equivalent structures.

What is claimed is:

1. A method for coding a motion vector comprising the steps of:
   computing two-dimensional prediction error information by using a motion vector to be coded and the n (n≧1) number of neighboring motion vectors;
   selecting prediction error information having the minimum bitrate from the computed prediction error information, wherein the prediction error information of minimum bitrate includes prediction error information of minimum bitrate applied to a factor 'X' and prediction error information of minimum bitrate applied to a factor 'Y';
   obtaining mode information indicative of a neighboring motion vector which has occurred the prediction error information of the minimum bitrate; and
   coding the obtained prediction error information of the minimum bitrate and the mode information.

2. The method of claim 1, wherein the prediction error information of a minimum bitrate is commonly applied to factors 'X' and 'Y'.

3. The method of claim 1, wherein the prediction error information of minimum bitrate of the factor 'X' and the factor 'Y' are sequentially linked.

4. The method of claim 1, wherein the mode information is commonly applied to the factors 'X' and 'Y'.

5. A method for coding a motion vector comprising the steps of:
   computing two-dimensional prediction error information by using a motion vector to be coded and the n (n≧1) number of neighboring motion vectors;
   selecting prediction error information having the minimum bitrate from the computed prediction error information;
   obtaining mode information indicative of a neighboring motion vector in which has occurred the prediction error information of the minimum bitrate, wherein the mode information includes mode information of a factor 'X' and mode information of a factor 'Y'; and
   coding the obtained prediction error information of the minimum bitrate and the mode information.

6. A method for coding a motion vector comprising the steps of:
   computing two-dimensional prediction error information by using a motion vector to be coded and the n (n≧1) number of neighboring motion vectors;
   selecting prediction error information having the minimum bitrate from the computed prediction error information;
   obtaining mode information indicative of a neighboring motion vector in which has occurred the prediction error information of the minimum bitrate, wherein the mode information of a factor 'X' and a factor 'Y' are sequentially linked; and
   coding the obtained prediction error information of the minimum bitrate and the mode information.

7. The method of claim 1, wherein the step of obtaining mode information comprises:
   defining 'n' number of candidate motion vectors by using the prediction error information of minimum bitrate and 'n(n≧1)' number of neighboring motion vectors;
   selecting an actually effective candidate motion vector from the defined candidate motion vectors; and
   assigning code information indicative of a candidate motion vector actually used for predicting the minimum bitrate among the selected candidate motion vectors.

8. The method of claim 7, wherein the code information is not assigned if there is one effective motion vector when 'n' is 3 and 1 bit code is assigned if there are two effective motion vectors.

9. The method of claim 8, wherein the code information is assigned in such a manner that, if there are three effective motion vectors, 1 bit code is assigned to one candidate motion vector and 2 bit code is assigned to the other two candidate motion vectors.

10. A method for coding a motion vector comprising the steps of:
    computing prediction error information between a motion vector to be coded and the n (n≧1) number of neighboring motion vectors;
    selecting prediction error information of the minimum bitrate from the computed prediction error information;
    checking whether factors of 'X' and 'Y' of the obtained prediction error information of the minimum bitrate are '0' and coding the prediction error information of the minimum bitrate; and
    coding mode information indicative of a neighboring motion vector which has generated the prediction error information of the minimum bitrate.

11. The method of claim 10, wherein the prediction error information of minimum bitrate is one-dimensional or two-dimensional.

12. The method of claim 10, wherein the prediction error information of minimum bitrate is coded to 1 bit information when a factor 'X' and a factor 'Y' are both '0'.

13. The method of claim 10, wherein the prediction error information of minimum bitrate is coded to 2 bit header information and corresponding prediction error information of minimum bitrate when the factors 'X' and 'Y' are not both '0'.

14. The method of claim 10, wherein the prediction error information of minimum bitrate is coded to 3 bit header information and prediction error information of minimum bitrate other than '0' when one of the factors 'X' and 'Y' is not '0'.

15. The method of claim 14, wherein the 3 bit header information indicates prediction error information of minimum bitrate of '0'.

16. The method of claim 10, wherein the prediction error information of minimum bitrate and the mode information are prediction error information of minimum bitrate commonly applied to the factors 'X' and 'Y'.

17. The method of claim 10, wherein the prediction error information of minimum bitrate includes prediction error information of minimum bitrate applied to the factor 'X' and prediction error information of minimum bitrate applied to the factor 'Y'.

18. The method of claim 17, wherein the prediction error information of minimum bitrate of the factor 'X' and the factor 'Y' are sequentially linked.

19. The method of claim 10, wherein the step of obtaining mode information comprises:
defining 'n' number of candidate motion vectors by using the prediction error information of minimum bitrate and 'n (n≧1)' number of neighboring motion vectors;
selecting an actually effective candidate motion vector from the defined candidate motion vectors; and
assigning code information indicative of a candidate motion vector actually used for predicting the minimum bitrate among the selected candidate motion vectors.

20. A method comprising:
computing two-dimensional prediction error information based on a motion vector and neighboring motion vectors;
selecting prediction error information from the computed two-dimensional prediction error information, wherein the selected prediction error information of the minimum bitrate includes prediction error information of minimum bitrate applied to an 'X' factor and prediction error information of minimum bitrate applied to a 'Y' factor;
obtaining mode information indicative of a neighboring motion vector used with the selected prediction error information; and
coding the selected prediction error information and the obtained mode information.

21. The method of claim 20, wherein obtaining mode information comprises:
defining a number of candidate motion vectors based on the selected prediction error information and the number of neighboring motion vectors; and
selecting an effective candidate motion vector from the defined candidate motion vectors.

22. The method of claim 21, wherein obtaining the mode information further comprises:
assigning code information indicative of a candidate motion vector used for predicting a minimum bitrate among the selected effective candidate motion vectors.

23. The method of claim 20, wherein coding mode information comprises:
defining a number of candidate motion vectors based on the selected prediction error information and the number of neighboring motion vectors; and
selecting an effective candidate motion vector from the defined candidate motion vectors.

24. A method comprising:
computing two-dimensional prediction error information based on a motion vector and neighboring motion vectors;
selecting prediction error information from the computed two-dimensional prediction error information;
obtaining mode information indicative of a neighboring motion vector used with the selected prediction error information, wherein the mode information includes mode information of an 'X' factor and mode information of a 'Y' factor; and
coding the selected prediction error information and the obtained mode information.

25. The method of claim 24, wherein the selected prediction error information comprises computed two-dimensional prediction error information having a minimum bitrate from among the computed two-dimensional prediction error information.

26. A method comprising:
computing prediction error information between a motion vector and neighboring motion vectors;
selecting prediction error information from the computed prediction error information;
checking whether an 'X' factor and a 'Y' factor of the selected prediction error information are '0' and coding the selected prediction error information based on the checking; and
coding mode information indicative of a neighboring motion vector used with the selected prediction error information.

27. The method of claim 26, wherein the selected prediction error information comprises prediction error information having a minimum bitrate from among the computed prediction error information.

28. The method of claim 26, wherein the prediction error information is coded to 1 bit information when the 'X' factor and the 'Y' factor are both '0'.

29. The method of claim 26, wherein the prediction error information is coded to 2 bit header information when the 'X' factor and the 'Y' factor are not both '0'.

30. The method of claim 26, wherein the prediction error information is coded to 3 bit header information and prediction error information of minimum bitrate other than '0' when one of the 'X' factor and 'the Y' factor is not '0'.

31. The method of claim 30, wherein coding the mode information further comprises:
assigning code information indicative of a candidate motion vector used for predicting a minimum bitrate among the selected effective candidate motion vectors.

* * * * *